Jan. 11, 1966  P. S. DELL'ARIA ETAL  3,229,291
SHIP SIMULATOR
Filed Jan. 30, 1961  3 Sheets-Sheet 1

INVENTOR
PAUL S. DELL'ARIA
JOHN W. GREER, JR.
ANDRE La POINTE
RAYMOND MOUNTJOY
BY
ATTORNEY

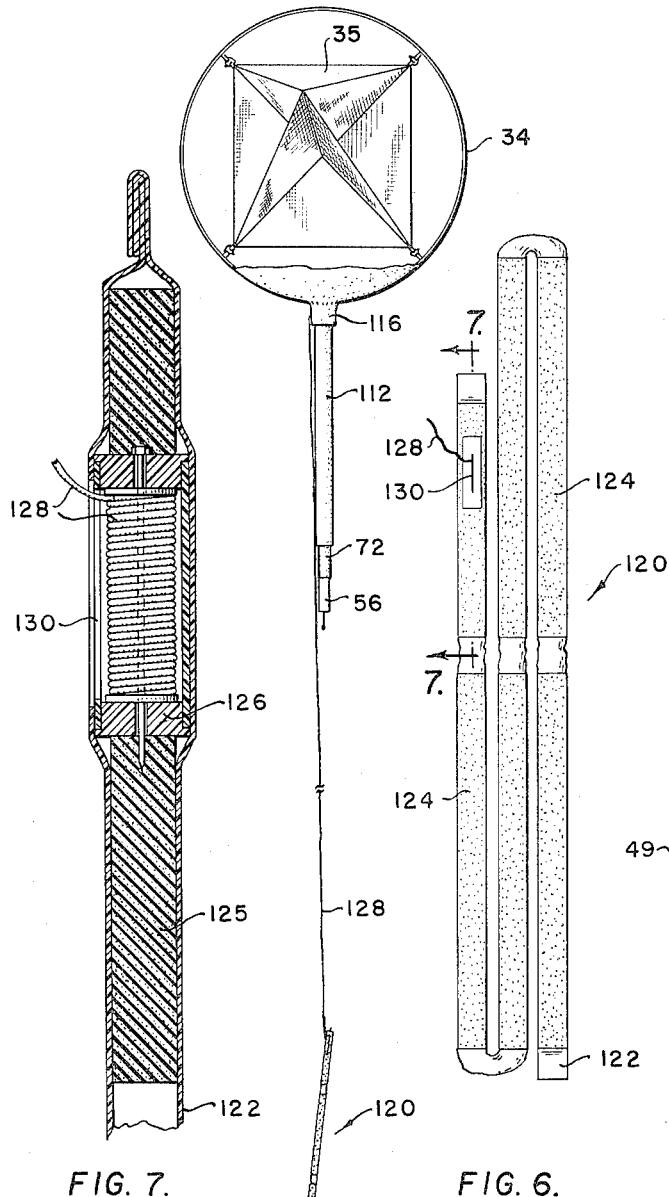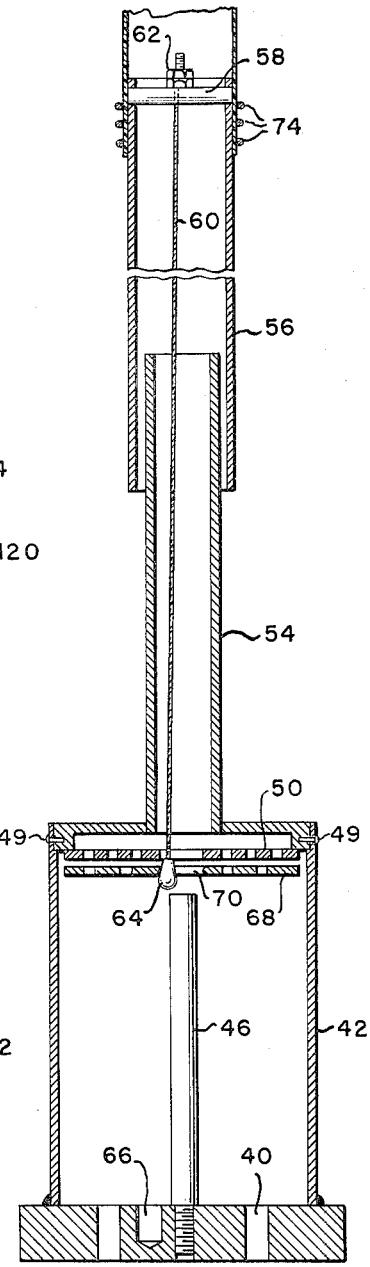

United States Patent Office 3,229,291
Patented Jan. 11, 1966

3,229,291
SHIP SIMULATOR
Paul S. Dell'Aria, North Arlington, Va., and John W. Greer, Jr., Kensington, Andre La Pointe, Rockville, and Raymond Mountjoy, Silver Spring, Md., assignors to the United States of America as represented by the Secretary of the Navy
Filed Jan. 30, 1961, Ser. No. 85,934
12 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

This invention relates to a radar decoy, and more particularly to a self-inflating balloon containing radar decoy reflector adapted to be launched from a ship.

The present invention relates to the broad field of radar countermeasures. One aspect of the field of radar countermeasures has been the attempt to provide a satisfactory radar reflective target that can be easily and quickly launched from a ship and allowed to operate in an unattended condition. It is necessary that the target produce, on the interrogating radar, an image that will have the effect of either simulating a ship or when used in relatively large quantities acting as a radar screen for nearby surface vessels. One of the necessary attributes of such a radar countermeasure is that it be so constructed that the radar target, or reflector, included therein is adapted to be suspended above the surface of the water at a fixed distance, and is capable of moving with ambient wind currents without being forced back onto the water and swamped or otherwise obliterated from the eyes of interrogating radar. One approach to this problem has been to include a radar reflector within an inflatable balloon. Such a device must, for practical reasons, be automatically self-inflatable so that it may be launched from a surface craft, and from that point on left unattended during inflation and operation thereof. Prior art attempts at such devices have met with failure due to rather complicated gas generating devices and the inability to provide a suitable valve construction that will allow gas to enter the balloon but reject any surrounding water. A further problem resides in the previous inability to provide a suitable means for anchoring the balloon so that it will not rise more than a predetermined distance above the surface of the water, and at the same time will not tend to be thrown onto the surface of said water by surrounding wind currents.

The apparatus forming the subject matter of the present invention includes a packaged assembly adapted to be dropped into the water from a surface vessel and includes an inflatable balloon having a radar corner-reflector therein and a buoyant-gas generating apparatus attached thereto. The generating apparatus is adapted to go into action as soon as it is submerged into the water. The apparatus further includes a check valve arrangement adapted to allow passage of gas into the balloon from the aforementioned generator, but at the same time reject any water entrapped with said gas. The apparatus is so constructed that when the balloon is inflated and is positioned above the surface of the water, it carries suspended therefrom a line of cord having at its lower end a plurality of float elements designed to float on the surface of the water. The floats provide sufficient weight to keep the balloon from being blown to altitudes completely out of range of the interrogating radar. At the same time the floats permit the balloon to be carried about on ambient wind currents without creating so great a drag as to cause the balloon to be blown onto the surface of the water and being swamped.

It is an object of this invention to provide a radar countermeasure adapted to cause an image simulating the presence of a ship or like surface vessel, on interrogating radar.

Another object of this invention is to provide an airborne radar reflective means.

Another object of this invention is to provide an automatic, water activated gas generator and balloon wherein the balloon includes a radar reflector, the entire assembly being adapted to be dropped into the water and automatically energized.

A further object of this invention is to provide an automatically inflatable, water launchable balloon and gas generator assembly, wherein said balloon contains a radar reflector, said generator being adapted to be energized by the water into which it is dropped and being automatically releasable from the balloon after inflation of said balloon.

Other objects and many of the attendant advantages of this invention will be readily appreciated as the same becomes better understood by reference to the following detailed description when considered in connection with the accompanying drawings wherein:

FIG. 4 is a sectional view of the gas generator portion of the instant invention at the completion of its gas generating operation;

FIG. 5 is a view showing the inflated radar reflector containing balloon included in the instant invention, substantially as it appears relative to the surface of the water, and including an anchoring mechanism therefor;

FIG. 6 is a view of the balloon float and anchoring apparatus used in conjunction with the instant invention; and FIG. 7 is a sectional view taken on line 7—7 of FIG. 6.

Figure 1:
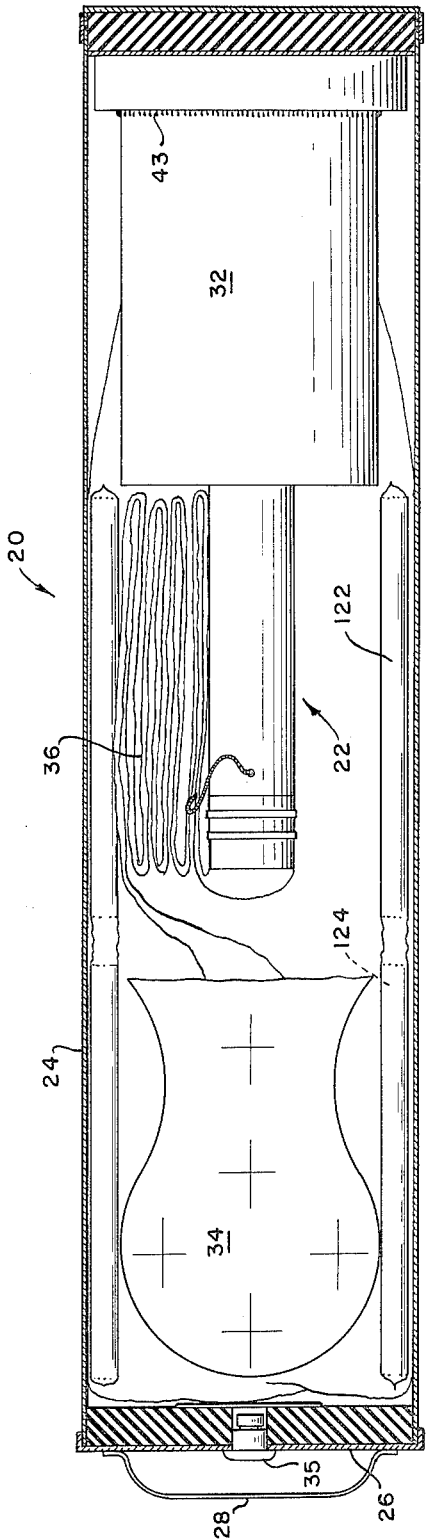
FIG. 1 is a sectional view of a preferred embodiment of the instant radar target assembly in a stored, prelaunched condition.

Referring now to the drawings wherein like reference characters designate like or corresponding parts throughout the several views, there is shown in FIG. 1 a packaged balloon and gas generator combination 20 which includes a balloon and gas generator combination apparatus 22 stored in a waterproof canister 24. The canister 24 includes a readily removable lid 26 having a handle 28 by which it may be removed from the canister 24. For reasons hereinafter set forth, the canister 24 has in its lid a pressure relief check valve 35 adapted to release air from within the canister but prevent admission of air thereinto.

The balloon and gas generator assembly 22 includes a gas generator 32 detachably connected to a balloon 34 by means of a tubular assembly 36.

Attention is specifically directed to FIGS. 1–4. The gas generator 32 includes a base plate 38 having a plurality of holes 40 extending therethrough. A cylindrical casing 42 has its lowermost edge affixed to the base 38 by a weld 43 or other such permanent means. The cylindrical casing 42 and the base 38 serve to form a container for a quantity of chemical 44 which when combined with water enters into a chemical reaction one of the products of which is hydrogen gas. A specific example, but by no means the only such material available, is lithium hydride.

The gas generator 32 further includes a rod 46 mounted within the generator and having one end thereof fixed to the base 38. The rod 46 extends upwardly of the generator to a point spaced from the upper end of the casing 42, and the aforementioned lithium hydride 44 is packed into the generator in rod surrounding condition.

The upper end of the gas generator 32 is provided with a cover plate 48 attached to the casing 42 by screws 49. In addition a strainer disk 50 is attached to the generator 32, in spaced relation with the cover plate 48. The strainer 50 is mounted in spaced relation with the plate 48 to form a cavity 52 between said cover plate and the strainer. The cover plate 48 has a centrally located hole formed therein, and within which is fixedly mounted one end of a rigid tube 54 having its lower end in communication with the interior of the gas generator 32.

The uppermost portion of the tube 54 is telescopically mounted within a substantially rigid, gas conveyance tube 56, which may be made of either metal or plastic. The tube 56 has fixedly connected to the interior thereof a transversely extending bar 58 which is so proportioned as to leave substantially the entire cross-section of the tube 56 open, and is used for purposes hereinafter described.

Figure 3:
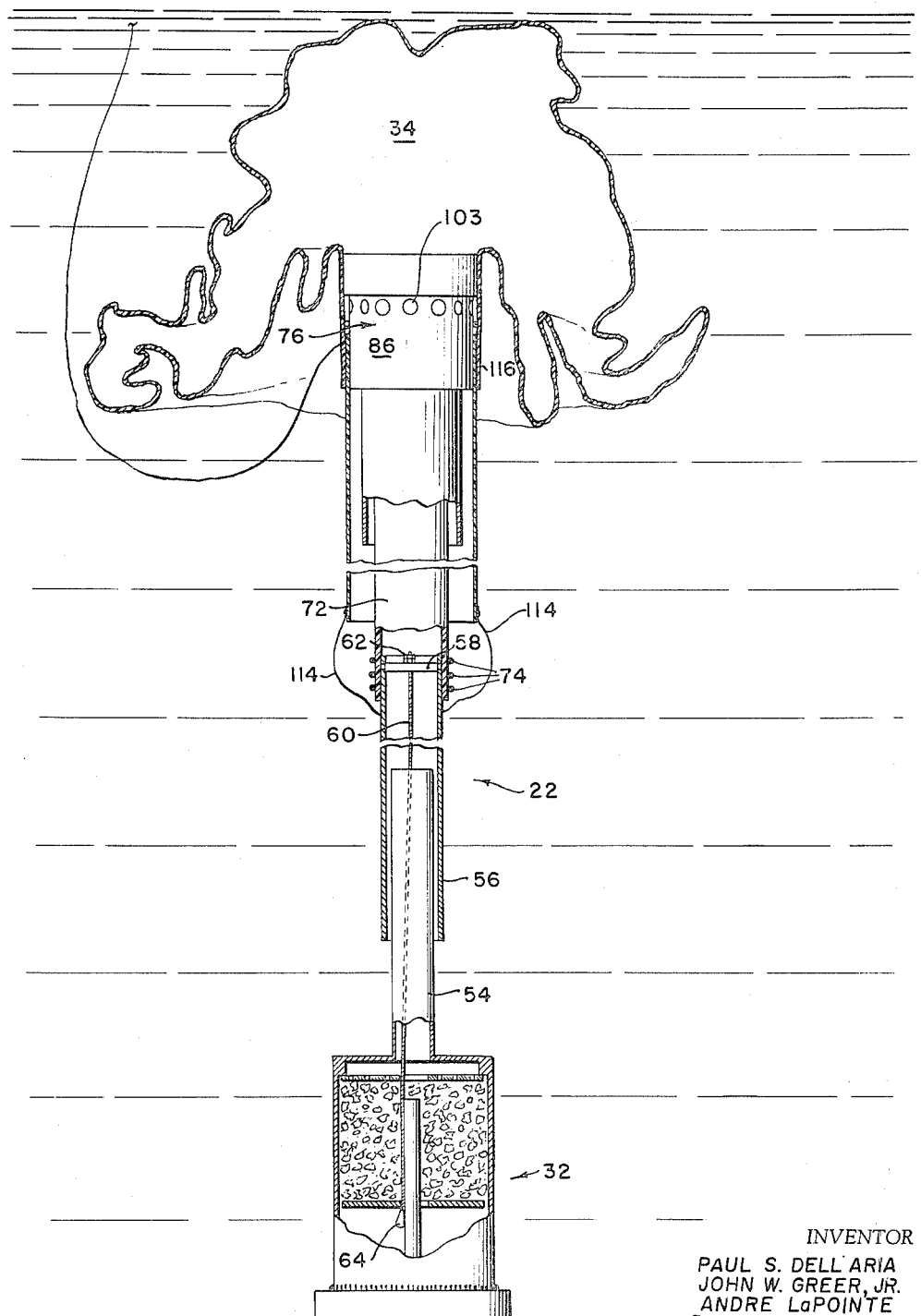
FIG. 3 is a substantially schematic view, partially in section, showing the instant balloon carrying radar decoy in a partially inflated underwater location.

The tube 56 is removably connected to the gas generator 32 by means of a flexible cable 60 having its uppermost end fixedly connected to the cross-bar 58 by any suitable clamp means 62. The cable 60 extends downwardly through the tubes 56 and 54, and a hole 63 in the strainer 50, and into the casing 42. As shown in FIGS. 3 and 4, the lower end of the cable 60 is provided with a fixedly attached, enlarged ball member 64 adapted to rest within a cavity 66 formed in the interior of the base plate 38.

Figure 2:
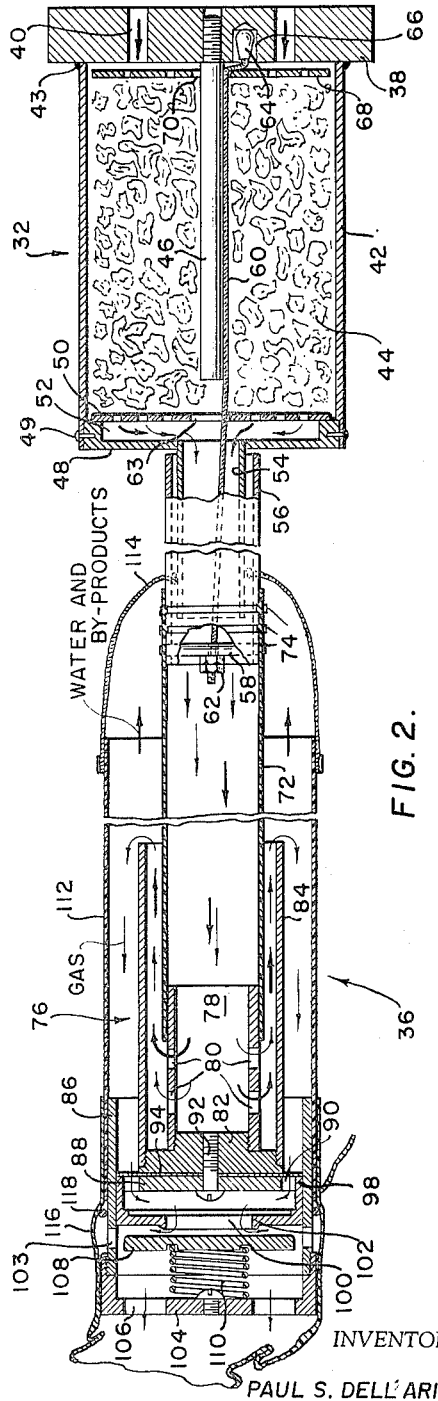
FIG. 2 is a sectional view of the embodiment shown in FIG. 1 showing primarily a gas generating apparatus and associated valve mechanism used in the instant invention.

When the casing 42 is full of lithium hydride, as shown in FIG. 2, the cable 60 extends downwardly along a side of the rod 46 and through a compression plate 68 slidably mounted on the rod 46. More particularly, the compression plate 68 is provided with a centrally located hole 70 by which it is slidably mounted on the rod 46, and through which the cable 60 extends. Prior to filling the casing 42, the ball 64 is slipped through the hole 63 in the strainer 50 and the hole 70 in the perforated compression plate 68 in substantially the manner shown in FIG. 4. This operation is made possible by the relationship between the amount of space between the upper end of the rod 46, the size of the hole 70 in the compression plate 68 and the size of the ball 64 on the end of the cable 60; these elements are so proportioned, as can be seen in FIG. 4, that the ball 64 may be slipped through the aforementioned hole and at the same time allow the rod 46 to pass, along with the cable 60 through the hole 70 in the compression plate 68.

After extending the ball 64 through the plate 68 and moving said plate 68 to its lowermost position in the casing 42, as shown in FIG. 2, the cover plate 48 and associated strainer 50 are removed from the casing 42 by removal of the screws 49, after which the container is filled, in a dry atmosphere, with a predetermined quantity of lithium hydride 44 or the like. At this point the various element are in the positions shown in FIG. 2.

Referring in particular to the tube 56 within which the pipe 54 is mounted and directing attention particularly to FIGS. 2, 3 and 4, it is pointed out that the upper end of the tube 56 is fixedly mounted, as by the use of adhesive or the like, within an elongated flexible tube 72. The rigid tube 56 is held in connected relation with the lower end of the flexible tube 72 by a plurality of encircling rubber bands 74 or the like. The upper end of the flexible tube 72 is fixedly connected, in water and gas tight relation, to a portion of a dynamic liquid separating check valve 76.

The check valve 76 is in turn mounted within the throat or opening of the balloon 34.

The check valve 76 includes a relatively short rigid tube 78 to which the flexible tube 72 is fixedly attached in a moisture and gas tight relation, as for example by the use of an adhesive material. The tube 78 is provided with a plurality of holes 80 adjacent its uppermost end. The upper end of the tube 78 is closed, being attached to a shouldered disk 82 which forms a part of the valve 76. The tube 78 may be attached to the disk 82 in any water and gas tight manner, as for example by being screwed onto the shouldered portion of said disk 82. An outer, rigid tube 84 has its uppermost end fixedly mounted on the periphery of the shouldered disk 82 in water and gas tight relation therewith. The tube 84 is substantially concentric with the tube 78 and the flexible tube 72, but is substantially shorter than the flexible tube 72. Thus an annular passageway is formed between the outer surface of the tubes 78 and 72 and the inside surface of the rigid tube 84, said passageway being closed at its upper end.

The valve 76 has attached to its upper end a cylindrical housing 86 made of rigid material and extending concentrically of, and partially overlapping, the tube 84. A disk 88, having a plurality of holes 90 extending therethrough, is clamped to the aforementioned shouldered disk 82 by means of a threaded screw 92 extending therethrough and threadedly mounted within the disk 82. A circular filter disk 94 made of screening or like perforate material is sandwiched between the disk 88 and the shouldered disk 82 to provide a filter element for gases passing through the holes 90.

The cylindrical housing 86 has a cup-shaped annular edge flange member 98 fixedly mounted therewithin. The annular edge flange 98 is in surface contact with the inner wall of the housing 86 and has its lower portion in peripheral contact with the disk 88. The transverse portion of the cup-shaped member 98 is spaced from the upper surface of the disks 88 and has an axially located hole 100 therein. The edge of the hole 100 is provided with an upwardly extending circular rib 102.

The upper edge of the housing 86 has fixedly connected thereto, as by screw threads or the like, an inverted cup-shaped cap member 104 having a plurality of holes 106 formed therein. The cap 104 is spaced from the cup-shaped member 98 and there is interposed between the cap 104 and cup-shaped member a valve closure disk 108. One surface of the disk 108 is adapted to close the hole 100 in the cup-shaped member 96 by abutment with the peripheral rib 102. The closure disk 108 is biased toward the rib 102 by a coil spring 110 interposed between the valve cap 104 and the closure disk 108.

The wall of the housing 86, of the valve 76, is provided with a plurality of holes 103 extending therethrough and located above the upper surface of the inverted cup-shaped member 96 and below the valve cap 104.

The outer surface of the housing 86 has fixedly attached thereto, adjacent its lowermost end, an elongated flexible tube 112, said tube being attached in moisture and gas tight relation with the housing 86. The tube 112 has a length greater than that of the rigid tube 84, but less than that of the flexible tube 72.

The lower end of the flexible plastic tube 112 is flexibly anchored to the rigid tube 56 by a number of flexible strings or cords 114 (FIGS. 2 and 3) for purposes of preventing said flexible tube 112 from unduly rising relative to the tube 56.

The entire valve assembly 76, including the various tubes and pipes attached thereto and described above, is fixedly mounted within a tubular neck portion 116 that forms a part of the opening into the balloon 34. The tubular neck portion 116 surrounds the upper portion of the flexible tube 112 and is cemented thereto in water and gas tight relation therewith throughout its periphery. The tube 116 is slightly spaced from the outer surface of the valve 76 by an annular ring 118 that surrounds said valve at a point below the holes 103 in the valve body, so as to maintain the inside of said tube 116 spaced from the aforementioned holes 103 and to allow passage of gases through said holes and into the balloon 34, in a manner hereinafter described.

Attention is directed to FIGS. 5, 6 and 7 wherein there is shown a balloon anchoring assembly 120.

The anchor assembly 120 comprises an elongated flexible plastic tube 122. The tube 122 has a plurality of spaced, buoyant flotation elements 124 mounted within said tube 122 in fixed relation thereto. The various flotation elements 124 are spaced from one another in the manner shown in FIG. 6 so as to render the assembly foldable and flexible, whereby it may take the folded position shown in FIG. 1 and the extended position shown in FIG. 5. The various flotation elements 124 may be made of any suitable buoyant material, such as foam rubber or the like.

As shown in FIG. 7, a flotation element 125 at one end of the elongated tube 122 is provided with a cut-out area, and has mounted in said cut-out area a spool 126 having a quantity of anchor cord 128 wound thereon. One end of the cord 128 extends outwardly of the tube 122 through a slit 130 formed in the tube 122. The outermost end of the line 128 is fixedly anchored to the tubular neck portion 116 of the balloon 34 (see FIG. 5). The cord 128 and anchor assembly 120 are, together, of such a length that the balloon is adapted to be maintained at some predetermined altitude above the surface of the water. The length and weight of the anchor assembly 120, including the flotation elements 124, is such, as compared to the buoyancy of the inflated balloon 34, that at least a portion of the flotation elements 124 will remain on the surface of the water and act against the buoyant force of the balloon, thereby anchoring the balloon, in a manner of speaking, to the surface of the water and preventing the complete escape of the balloon from said water surface. At the same time, the anchor elements 124 are light enough so that the balloon is allowed to move freely with ambient wind currents without any danger of the balloon being swept onto the surface of the water by such ambient wind currents.

With the balloon in fully inflated condition, as shown in FIG. 5, and with the radar reflector 35 contained therein being in fully extended position, the balloon 34 and anchor elements 124 take substantially the positions shown in said figure.

Operation

Reference is now made to FIGS. 1 through 4. Prior to launching, the instant balloon and gas generator combination is charged by filling the gas generator 32 with a quantity of lithium hydride, or any other material adapted to generate a lighter-than-air gas upon contact of said material with water. The gas generator 32, when fully loaded with lithium hydride 44, has the elements thereof, namely the plate 68, the rod 46 and the cable 60 arranged in the relative positions shown in FIG. 2. After charging the generator 32 the entire assembly is loaded into the canister 24 with the generator being placed at the bottom of the canister and the balloon at the top with the various flexible tubular elements 72 and 112 being folded up in the manner shown in FIG. 1. The flotation assembly 120 is also folded within the canister 24 in essentially the manner shown in FIG. 1.

It is emphasized that the charging of the gas generator and the assembly thereof into the canister 24 should be done in a substantially moisture-free atmosphere, in order to prevent any reaction of air-borne moisture with the lithium hydride. To prevent the build-up of air pressure within the canister 24, and keep it air-tight after the lid 26 is put in place, said lid is provided with the aforementioned pressure relief valve 35, which allows any air within the container to escape therefrom, but prevents entry of air into the said container.

In order to launch the instant balloon and generator assembly 20, the cap 26 is removed from the canister 24 and the entire assembly dumped from the canister into the water, at which time the assembly takes essentially the position shown in FIGS. 2, 3, and 4. Substantially the entire assembly is in a vertical position due to the fact that the canister 32 is substantially heavier than the rest of the equipment.

Immediately, water enters the generator container 42 through the holes 40 and the holes 70 in the perforate slidable plate 68 and commences to react with the lithium hydride 44. Hydrogen gas is thus generated, and it proceeds to rise through the holes in the perforate strainer plate 50, including the center hole 63, and proceeds upwardly toward the balloon 34 through the rigid pipes 54 and 56, and the flexible tube 72.

It is emphasized that upon the initiation of the reaction there will usually be an initial, rather violent, surge of gas and water upwardly through the aforementioned tubes.

In order to prevent entry of water into the balloon 34, the aforementioned tube and valve arrangement has been evolved and operates essentially as follows. It is pointed out that in FIG. 2 water has been designated by the heavy arrows while gas is designated by the light arrows, and that upon the commencement of the reaction, and at times as said reaction proceeds, both water and gas proceed upwardly through the tube 72 and upon meeting a dead end at the disk 82, both the water and gas pass through the holes 80 into the pipe 78 affixed to the disk 82. By the action of gravity the water proceeds downwardly through the space between the intermediate pipe 84 and the innermost pipe 78 and tube 72. The pressure of gas rising through the tube 72 forces the gas into the intermediate space downwardly along with the water. Due to the action of gravity the water proceeds downwardly below the lower end of the intermediate pipe 84, while the gas due to its inherent buoyancy reverses direction and starts to rise through the space between the outermost resilient tube 112 and the intermediate pipe 84, as shown in FIG. 2.

As the gas continues to rise between the resilient tube 112 and the rigid pipe 84, it passes through the holes 90 in the disk 88 at the lower end of the valve 76, and then attempts to pass through the hole 100 in the cup-shaped member 98.

The pressure of the gas attempting to pass through the hole 100 forces the valve closure disk 108 upwardly against the action of spring 110 thus opening the valve and allowing the gas to pass around the closure disk 108 and through the holes 106 into the balloon 34.

The valve structure 76 forms an important part of the instant invention and insures that it functions properly. As indicated above the function of the valve 76 is to separate the water and gas rising in the innermost tube 72, from the gas generator 32, to permit only the gas to enter the balloon 34. When the chemical in the basket 42 reacts with the water, hydrogen is released in a very turbulent fashion. By virtue of its buoyancy the hydrogen travels up the tubes 54, 56 and 72, which latter tube, in accordance with one embodiment of the invention, is approximately 9 feet long, and the hydrogen takes with it a considerable amount of water. At the top of the tube 72, where the valve 76 is located, the direction of gas and water is reversed in the manner set forth above. Both gas and water are forced to travel downward a distance of about seven inches in the embodiment referred to above, that is, the length of the space between the intermediate pipe 84 and the innermost tubes 72 and 78. The water having once been headed downward continues in that direction due to the force of gravity. As soon as the gas reaches the lowermost end of the intermediate pipe 84, it can again travel upwardly and does so, thus effecting a separation of water and gas.

As is obvious, water can enter or leave the outer flexible tube 112 since it is open at the bottom. If the water were permitted to rise as far as the top of the valve 76, the generated gas would force the water into the balloon. In order to prevent this, a gas cushion or pocket is provided at the upper end of the space between the outer-most tube 112 and the intermediate pipe 84 that keeps the surface of the water below the mouth of the intermediate tube 84, which in accordance with the embodiment referred to above, is about 7 inches long. To accomplish this, the top of the valve is fitted with the aforementioned spring loaded valve closure disk 108 which by its tendency to remain closed creates a gas pressure in the space between the outermost tube 112 and the intermediate pipe 84, equivalent to a head of water of about 3 feet thus keeping the top 3 feet of the outer tube 112 clear of water. Thus the aforementioned combination of elements, together with the proper adjustment of the tension of the spring 110 serves to insure a dry balloon.

It is pointed out that the quantity of lithium hydride within the chemical container 42 is such as to provide a sufficient amount of gas to fully inflate the balloon. As gas is being generated in the container 42, and the chemical 44 is being consumed, the container 42 and the tube 54 extending upwardly therefrom, slide downwardly relative to the assembly located above the generator. However the generator is held connected to the upper assembly by the linkage including the cable 60, the ball 64 at the lower end thereof, slidable plate 68, hole 70 extending therethrough and the rod 46, all in the manner shown in FIG. 3. FIG. 3 shows the instant apparatus at an intermediate stage of operation, before the chemical 44 is completely consumed.

When the chemical 44 is completely consumed the various elements take the relative positions shown in FIG. 4 at which time the ball 64 is adapted to slip through the hole 70 which has moved beyond the upper end of the rod 46 thus allowing the gas generator 32 and the various elements contained and fixedly connected thereto to slip free of the remainder of the apparatus located thereabove. At this point the balloon 34 is fully inflated and the radar reflector 35 is in an extended position, as shown in FIG. 5 and said balloon proceeds to rise above the surface of the water. At the same time the line 128 carried on the spool 126 within the endmost flotation element 24 is unreeled. As pointed out above, the flotation gear 120 has such a weight to buoyancy ratio as to maintain the balloon movably tethered to the surface of the water, and at the same time allow the balloon to drift along the surface at a substantially uniform height, along with the ambient wind currents. At the same time, the flotation assembly 120 presents such a low order of drag as to prevent the balloon from being blown onto the surface of the water and swamped.

Thus the instant invention provides a combination of a gas generator and inflatable balloon having a radar reflective antenna therein. The balloon is adapted to be automatically inflated upon immersion of the entire assembly in water so that the balloon may rise above the surface of the water and present the radar reflector 35 contained therein as a false target to interrogating radar.

It is pointed out that the length of cord 128 and the size of balloon and radar reflector are such that the balloon by virtue of its size and height above the water presents to interrogating radar an image resembling a surface vessel. While the radar image may not be an exact indication of a surface vessel, the image is of such a nature as to require investigation to determine the exact nature of the target indicated. Accordingly the instant invention provides a highly satisfactory radar countermeasure device adapted to simulate a surface vessel, or the like, to interrogating radar, and which is adapted to be launched into the water and automatically become airborne without the necessity of either elaborate automatic gear or the continual attendance of an operator. The instant invention could, for example, be launched from either a passing vessel, a manned aircraft or guided missile of one sort or another.

In addition, the instant invention provides a balloon inflation means including a valve arrangement that is adapted to insure that during balloon inflation, lighter than air gas enters the balloon and that water is prevented from entering said balloon, thereby insuring that the interior of the balloon is dry at all times.

In accordance with one embodiment of the instant invention, but by no means the only embodiment, the flotation gear 120 includes 100 feet of nylon line 128, and is made up of 6 sections of sponge rubber, five of which are 1 inch thick by 2 inches wide, by 23 inches long. The first section, or that nearest the balloon, is slightly shorter in length and contains the spool 126. The sections of sponge rubber are placed in tandem 6 inches apart, tied together by nylon cord, and the entire assembly is encased in the aforementioned thin, flexible waterproof vinyl tubing 122. The weight of the entire float assembly is just a little greater than the net buoyance of the balloon 34. In fact, all of the sections of the flotation, except the last two or three are raised out of the water by the inflated balloon. The vinyl tubing 122, and the narrow cross-section of the floats serves to present a minimum drag in water; hence the entire unit will generally travel at speeds close to the ambient wind velocity. The fact that the drag is small insures that the balloon will not be blown onto the water.

In accordance with the aforementioned embodiment of the instant invention, the corner reflector 35 is 3 feet on a leg and therefore the balloon 34, when inflated, is approximately 6 feet in diameter. Accordingly the size of the chemical basket 42 is such that it will contain a sufficient amount of hydrogen generation chemical to fully inflate the balloon 34.

Obviously many modifications and variations of the present invention are possible in the light of the above teachings. It is therefore to be understood that within the scope of the appended claims the invention may be practiced otherwise than as specifically described.

What is claimed is:

1. A water launchable, inflatable balloon and gas generator combination comprising, a balloon having an opening formed therein, a gas generator connected to said balloon and having means for conducting gas from the generator, through said opening and into the balloon, said gas generator including a water pervious container, a quantity of expendable chemical in said container adapted to combine with water to produce a lighter than air gas, conduit means interposed between and fluidly coupling said gas generator with the opening in said balloon to conduct gas, and any water entrained with said gas, from the generator into said balloon, said conduit means comprising a plurality of passages in fluid coupled relation defining in succession a first upward flow path fluidly coupled at its bottom to said gas generator, a downward flow path fluidly coupled at its upper end to the upper end of said first flow path, said downward flow path having an intermediate opening, and a second upward flow path fluidly coupled to the opening in said downward flow path, whereby the gas and entrained water are constrained to flow together upwardly in said first upward flow path under the dynamic pressure of the generated gas and then downwardly in said downward flow path under the influence of both the dynamic pressure and the force of gravity, the gas being constrained to escape due to its light weight via said opening and via said second upward flow path into said balloon, while the water is constrained by its weight to continue flowing downwardly past said opening in said downward flow path, whereby only gas enters the balloon, and resiliently biased flow resisting means coupled between the upper end of the second upward flow path and the entrance to the balloon for providing a pressure head to prevent the occurrence of a level of free water in communication with said opening in the downward flow path.

2. A water launchable, inflatable balloon and gas generator combination as set forth in claim 1, further including means interconnecting said balloon and gas generator, said means including a plate intimately contacting the bottom surface of the gas producing expendable chemical, said plate having an aperture therein, a rod upstanding in said water pervious container and surrounded by said aperture, and a body suspendedly mounted from said balloon in a position below said plate and adapted to be held in said position by the boundaries of said rod and aperture, said water pervious container having an aperture in its top, the top of the container being spaced from the top end of the rod, whereby upon consumption of said chemical said plate moves upwardly to free said body for movement past the rod and thru said apertures thereby freeing the water pervious container from connection from said balloon so as to automatically release said gas generator from the balloon upon complete consumption of the gas producing chemical in said container.

3. A water launchable, inflatable balloon and gas generator combination comprising, an inflatable balloon having an opening formed therein, a gas generator removably connected to said balloon, said gas generator including a water pervious container having a watertight, top coverplate, a quantity of expendable chemical in said container adapted to produce a lighter-than-air gas upon the combination thereof with water, a tube connected to said coverplate and in communication with the interior of the container, tubular means mounted in the opening in said balloon and telescopically mounted over the tube connected to said cover plate; a rod vertically mounted within the container, a plate slidably mounted on said rod for movement therealong, said plate having a hole formed therein through which the rod extends, said rod having an upper free end spaced from the inside of the cover plate, said slidable plate having a quantity of said expendable chemical interposed between its upper surface and the inner surface of said cover plate, an elongated member having a lower, free end and an upper end fixedly attached to the tubular means connected to said balloon and having a portion thereof extending downwardly through the hole in the center of said slidable plate, a ball member affixed to the lower end of said elongated member and located below said slidable plate, said ball member being wider than the maximum space between the edge of the hole in said plate member and said rod, whereby said gas generator is held connected to the tubular means connected with the balloon, said slidable plate being adapted to move beyond the upper end of said rod upon complete consumption of the expendable chemical within the gas generator, whereby upon the action of gravity on the container said ball member is adapted to move outwardly of the axial hole in said slidable plate and freely through the tube on the container, thereby allowing the gas generator to drop free of the balloon upon complete consumption of the chemical contained within the generator.

4. A combination of a water launchable, inflatable balloon and gas generator comprising, an inflatable balloon having an opening therein, a lighter-than-air gas producing generator connected to said balloon and being heavier than said balloon whereby the assembly is maintained in a substantially vertical position during inflation in water, a check valve in the opening in said balloon, said check valve being so arranged as to allow passage of gas only into said balloon; a gas conveyance system interconnecting said balloon and said generator and including an outermost elongated tube extending downwardly from said balloon and connected to said balloon for fluid coupling with the opening thereof, an innermost concentric elongated tubular assembly connected to said valve and extending downwardly therefrom and connected to said gas generator for providing a dynamic flow path to convey gas and any water entrained therewith, from said generator toward said balloon, an intermediate, downwardly extending tube connected to the valve and concentrically mounted within said outer tube, said intermediate tube having a length less than that of the outermost tube and the innermost tube, said innermost tubular assembly being closed at its upper end and having a plurality of openings formed in its side wall adjacent its upper end, whereby gas and entrained water may escape therefrom into the space between said innermost tubular assembly and the intermediate tube, the space between said innermost tubular assembly and the intermediate tube being closed at its upper end whereby the gas and entrained water must both flow downwardly through said space, said water being constrained to continue flowing downwardly under the force of gravity continuing downwardly while the gas flows upwardly through the space between the outer tube and the intermediate tube, said gas thereby being separated from the entrained water for flow through said check valve and into the balloon and resilient biasing means acting on said check valve for providing a predetermined resistance to said flow into said balloon whereby a pressure head results in said flow path for maintaining the level of free water at least below the lower termination of said intermediate tube.

5. A combination of a water launchable, inflatable balloon and gas generator, as set forth in claim 4, wherein said gas generator comprises a hollow, water pervious container of such a weight as to assume a substantially vertical position in the water during inflation of the balloon, said container including a top cover having an elongated tubular member extending therefrom and telescopically carried within the innermost tube connected to the balloon, the tubular member on said container being in communication with the interior of said container, a vertically mounted rod connected to the inside of the bottom of the container and having its upper end spaced from the inner surface of the top cover, a water pervious plate having a hole formed in the center thereof through which said rod extends, whereby said plate is slidably mounted on said rod; a quantity of chemical adapted to generate a lighter-than-air gas upon combination thereof with water, said quantity of chemical being interposed between the top surface of said slidable plate and the inside of the top cover of said generator, an elongated member having one end fixedly connected to said innermost tube and its opposite end extended through the elongated tubular member on the generator and through the hole in said slidable plate, said elongated member having at said opposite end, and beneath the slidable plate, an enlarged ball-like member of a width greater than the space between said hole and the surface of said rod, whereby said slidable plate is pulled upwardly relative to the interior of said gas generator as the gas generating chemical therein is expended; said slidable plate being adapted to move free of the upper end of said rod whereby the ball member and the elongated member to which it is affixed are adapted to slip free of the rod and slidable plate, thereby releasing the gas generator from connection with the balloon upon the generation of a predetermined quantity of gas.

6. A combination water launchable, inflatable balloon and gas generator, as set forth in claim 5, wherein said chemical is lithium hydride and the gas generated therefrom upon combination therewith with water is hydrogen.

7. A combination water launchable, inflatable balloon and gas generator, as set forth in claim 5 wherein there is also included an anchor means attached to the balloon, whereby said balloon is adapted to be anchored at a predetermined height above the surface of the water.

8. A radar decoy comprising, a balloon inflated with lighter-than-air gas, a radar reflector mounted within said balloon, means for anchoring said balloon a predetermined distance above the surface of the water, said means including a flexible line having one end attached to said balloon and the opposite end attached to a plurality of flexibly interconnected float elements, the buoyancy of said float elements being so proportioned relative to the weight of the balloon as to maintain said balloon at a predetermined height, said float elements also being proportioned to present low enough drag to said balloon whereby said decoy may move close to the speed of wind currents acting thereon.

9. A radar target decoy comprising an outer casing, a balloon having a collapsible radar reflector unit mounted in said casing, water-actuated gas generating means detachably connected to said balloon for filling said balloon with lighter-than-air gas, means for positioning said balloon when inflated a predetermined elevation above the surface of water, said means comprising a plurality of foldably connected buoyant elements mounted in said casing in a folded position and connected to said balloon, said foldably connected elements having sufficient displacement in water to hold said balloon at its predetermined elevation, and said foldably connected elements having sufficiently small drag in water in relation to wind forces acting on said balloon so that said balloon may move at lateral speeds close to the wind velocity over water to simulate ship movements.

10. Apparatus as defined according to claim 9 but further characterized by each of said foldably connected elements comprising buoyant material.

11. Apparatus as defined according to claim 9 but further characterized by each of said foldably connected elements comprising an essentially buoyant, spongy material essentially rod-like in form.

12. A water launchable, inflatable balloon and gas generator combination comprising, a balloon having an opening formed therein, a gas generator connected to said balloon and having means for conducting gas from the generator, through said opening and into the balloon, said gas generator including a water pervious container, a quantity of expendable chemical in said container adapted to combine with water to produce a lighter than air gas, conduit means interposed between and fluidly coupling said gas generator with the opening in said balloon to conduct gas, and any water entrained with said gas, from the generator into said balloon, and means for separating the gas and the water entrained therewith so as to allow only the gas to enter said balloon, said balloon having contained therein a collapsible radar reflector, and wherein the combination includes means for tethering the inflated, buoyant balloon at a predetermined height above the surface of the water said means comprising flotation elements of sufficiently light weight to present low drag to movement of said balloon and sufficient displacement for holding said balloon at a predetermined elevation.

References Cited by the Examiner

UNITED STATES PATENTS

| | | | |
|---|---|---|---|
| 2,392,199 | 1/1946 | Steiger | 244—33 X |
| 2,463,517 | 3/1949 | Chromak | 343—18 |
| 2,470,783 | 4/1949 | Mead | 343—18 X |
| 2,516,934 | 8/1950 | Weaver | 23—282 |
| 2,570,549 | 10/1951 | Hansell | 343—18 |

LEWIS H. MYERS, *Primary Examiner.*

FREDERICK M. STRADER, CHESTER L. JUSTUS,
*Examiners.*

C. F. ROBERTS, *Assistant Examiner.*